United States Patent
Jackman

(10) Patent No.: US 9,223,331 B2
(45) Date of Patent: Dec. 29, 2015

(54) POWER DISTRIBUTION SYSTEM CONTROL AND MONITORING

(71) Applicant: John F. Jackman, Salt Lake City, UT (US)

(72) Inventor: John F. Jackman, Salt Lake City, UT (US)

(*) Notice: Subject to any disclaimer, the term of this patent is extended or adjusted under 35 U.S.C. 154(b) by 0 days.

(21) Appl. No.: 13/764,307

(22) Filed: Feb. 11, 2013

(65) Prior Publication Data

US 2013/0147443 A1 Jun. 13, 2013

Related U.S. Application Data

(60) Continuation of application No. 13/346,552, filed on Jan. 9, 2012, now Pat. No. 8,373,393, which is a division of application No. 12/272,731, filed on Nov. 17, 2008, now Pat. No. 8,093,871.

(60) Provisional application No. 60/988,732, filed on Nov. 16, 2007.

(51) Int. Cl.
*G05F 1/70* (2006.01)
*H02J 3/18* (2006.01)

(52) U.S. Cl.
CPC .............. *G05F 1/70* (2013.01); *H02J 3/1828* (2013.01); *Y02E 40/30* (2013.01)

(58) Field of Classification Search
CPC ..... Y02B 70/126; G05F 1/70; H02M 1/4225; H02M 1/4208; Y02E 40/30; H02J 3/1828
USPC ................................. 323/207–209
See application file for complete search history.

(56) References Cited

U.S. PATENT DOCUMENTS

| | | | |
|---|---|---|---|
| 4,679,133 A | 7/1987 | Moscovici | |
| 5,465,040 A | 11/1995 | Yasotornrat | |
| 5,471,118 A | 11/1995 | Nilssen | |
| 5,608,276 A * | 3/1997 | Suelzle | 307/152 |
| 5,614,770 A * | 3/1997 | Suelzle | 307/105 |
| 6,108,222 A | 8/2000 | Liang | |
| 6,834,002 B2 | 12/2004 | Yang | |
| 6,900,619 B2 * | 5/2005 | Kehrli et al. | 323/207 |
| 7,061,779 B2 | 6/2006 | Yang | |
| 7,446,511 B2 * | 11/2008 | Wu et al. | 323/207 |
| 8,093,871 B2 * | 1/2012 | Jackman | 323/209 |
| 2005/0212494 A1 * | 9/2005 | Wu et al. | 323/207 |

OTHER PUBLICATIONS

U.S. Appl. No. 12/272,731, filed Jan. 31, 2011, Office Action.
U.S. Appl. No. 12/272,731, filed Sep. 13, 2011, Notice of Allowance.
U.S. Appl. No. 13/346,552, filed May 10, 2012, Ex Parte Quayle Action.

* cited by examiner

*Primary Examiner* — Jue Zhang
(74) *Attorney, Agent, or Firm* — Workman Nydegger

(57) ABSTRACT

In one example embodiment, a power control system includes one or more stages, a plurality of primary busbars operatively coupled to the one or more stages, and an intelligent controller operatively coupled to the one or more stages. Each of the one or more stages is configured to generate a lead current when coupled in parallel to a power distribution system, and at least one of the one or more stages comprises a notch filter and a power tank circuit. Each of the plurality of primary busbars is configured to carry one phase of a multiple phase power signal. The controller is configured to determine when to switch each of the one or more stages one and off, to count a number of times each stage is switched on, and to track one or more electrical parameters of the power distribution system, power control system, or both.

8 Claims, 11 Drawing Sheets

POWER DISTRIBUTION SYSTEM CONTROL AND MONITORING

CROSS-REFERENCE TO RELATED APPLICATIONS

The present application is a continuation application of U.S. application Ser. No. 13/346,552, filed Jan. 9, 2012, entitled "POWER DISTRIBUTION SYSTEM AND MONITORING" which is a divisional application of U.S. application Ser. No. 12/272,731, filed Nov. 17, 2008, entitled "POWER DISTRIBUTION SYSTEM CONTROL AND MONITORING," now U.S. Pat. No. 8,093,871, which claims the benefit of and priority to U.S. Provisional Application Ser. No. 60/988,732, entitled "POWER DISTRIBUTION SYSTEM CONTROL AND MONITORING," filed Nov. 16, 2007, the contents of each of the foregoing applications are incorporated herein, in their entirety, by this reference.

BACKGROUND

1. Field of the Invention

The present invention generally relates to methods, systems, and devices for use in power distribution systems. More specifically, some example embodiments of the invention relate to a power control system for providing power factor correction in a power distribution system.

2. The Relevant Technology

In multiple phase power distribution systems, such as three-phase systems, much effort is expended in order to compensate for loads having less than idea power factors. Ideally, the transmitted alternating voltage and current are always in phase. Power is transmitted most efficiently when the alternative voltage and current are in phase.

In practice, electrical power providers have found that the loads presented to their power distributions systems have been, in aggregate, inductive in nature rather than purely resistive. Inductive loads cause the phase of the alternating current to lag behind the phase of the alternating voltage. The measure of the degree of current lag is called the power factor and is expressed as the cosine of the angle θ between the alternating voltage and the alternating current. Generally, the larger the inductance of the load, the greater the lag current.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

In general, example embodiments of the invention relate to power control systems for use in power distribution systems.

In one example embodiment, a power control system includes one or more stages, a plurality of primary busbars operatively coupled to each of the one or more stages, and an intelligent controller operatively coupled to each of the one or more stages. Each of the one or more stages is configured to generate a lead current when coupled in parallel to a power distribution system, and at least one of the one or more stages comprises a notch filter and a power tank circuit. Each of the plurality of primary busbars is configured to carry one phase of a multiple phase power signal. The controller is configured to determine when to switch each of the one or more stages one and off, to count a number of times each stage is switched on, and to track one or more electrical parameters of the power distribution system, power control system, or both.

In another example embodiment, a power capacitor is provided that can be implemented in one or more stages of a power control system. The power capacitor includes three balanced capacitors arranged in a delta configuration, three resistors, and three diodes. The delta configuration includes three contact points interposed between the three balanced capacitors. Each resistor includes two inputs and one output, each input being coupled to one of the three contact points. The three diodes are configured to allow power stored in the balanced capacitors to be discharged from the power capacitor. Each diode includes an input coupled to an output of a different resistor and an output coupled to ground.

These and other aspects of example embodiments of the invention will become more fully apparent from the following description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Embodiments of the invention relate to systems, methods, and devices for use in power distribution systems. Embodiments of the invention include a power control system and various components for use within and by the power control system and/or other systems, the components including a controller, capacitor switching contactors, power capacitors, tuned reactor zig-zag transformers, and active harmonic filters.

I. Power Control System

Figure 1:
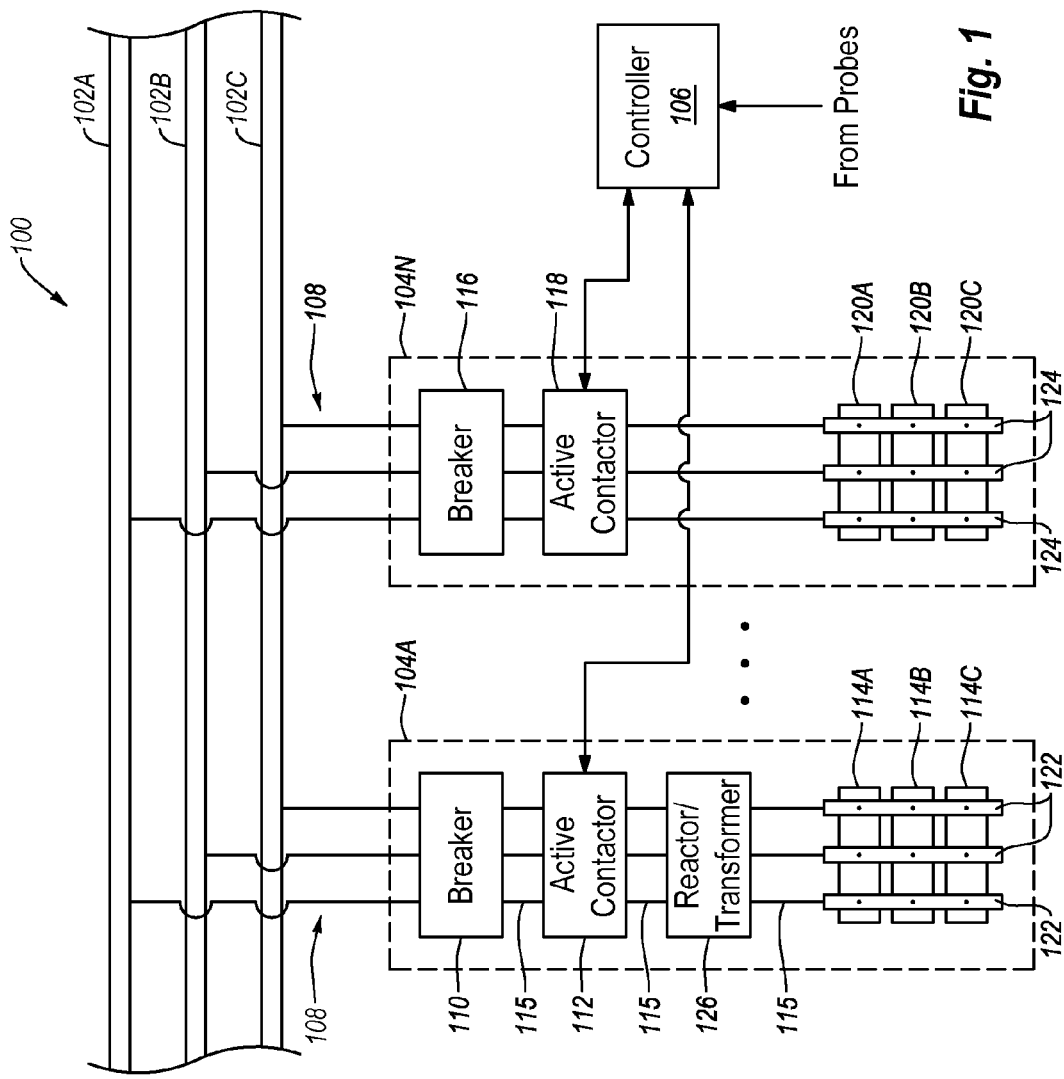
FIG. 1 illustrates a first example embodiment of a power control system according to embodiments of the invention.

With reference first to FIG. 1, one example power control system 100 is depicted according to embodiments of the invention. The power control system 100 in some embodiments operates to provide power factor correction, harmonic suppression, voltage variance suppression, and/or a power tank storage function in a multiple phase alternating current ("AC") environment, such as a three phase power distribution system. While the power control system 100 and its components will be described in some detail, the power control system 100 and its components are provided by way of example only and should not be construed to limit the invention.

The power control system 100 includes a plurality of primary busbars 102A, 102B, 102C (referred to collectively herein as "primary busbars 102"), one or more stages 104A to 104N (collectively referred to herein as "stages 104"), and a controller 106. In some embodiments, the primary busbars 102 comprise copper busbars rated for 600 amps, and each of the primary busbars 102 is configured to carry one phase of a multiple phase power signal. In the present example, for instance, each of the primary busbars 102 is configured to carry one phase of a three-phase power signal such as may be implemented in power distribution systems throughout the world.

The primary busbars 102 are operatively coupled to each of the one or more stages 104 via conductive wires 108. In some embodiments, each of the conductive wires 108 is rated for approximately 100 amps.

The number of stages 104 in the power control system 100 can depend in some embodiments on the needs of the power distribution system in which the power control system 100 is implemented. For instance, the power distribution system 100 for a single-family dwelling may implement a power control system with a single stage 104A or only a few stages 104, whereas a power distribution system for a factory or multi-story office building may implement a power control system with a greater number of stages 104, such as up to twelve stages 104 in some embodiments. Alternately or additionally, the power control system 100 can include a fixed number of stages 104 without regard to the needs of the power distribution system in which the power control system 100 is implemented. Optionally, manufacturers and/or vendors of the power control system 100 can provide a design allowance to add or take out stages 104 quickly and easily to upgrade or downgrade the power control system 100 according to changes as may be necessary when a customer grows or reduces their power needs.

Further, the configuration of each stage 104 in a multi-stage power control system 100 can be the same or different. For instance, each stage can be configured to create a lead current to cancel out a lag current in the multiple phase power signal carried by the primary busbars 102. Alternately or additionally, one stage can be configured to suppress a first harmonic frequency on the multiple phase power signal. Alternately or additionally, one or more other stages can be configured to suppress one or more other harmonic frequencies on the multiple phase power signal. Each stage configured to suppress a harmonic frequency may suppress one of the harmonic frequencies selected from the group consisting of the $3^{rd}$, $5^{th}$, and $7^{th}$ harmonic frequencies, or other harmonic frequencies in some embodiments. One example embodiment of a stage configured to suppress a particular harmonic frequency (e.g., stage 104A) on the multiple phase power signal will be described in more detail below.

As disclosed in FIG. 1, stage 104A includes a multiple phase circuit breaker 110 coupled to the busbars 102, a capacitor switching contactor 112 coupled to the multiple phase circuit breaker 110, and one or more power capacitors 114A, 114B, 114C (collectively referred to herein as "power capacitors 114"). The multiple phase circuit breaker 110, capacitor switching contactor 112 and/or power capacitors 114 can be coupled together via conductive wires 115 that may comprise wire rated for 100 amps in some embodiments.

The multiple phase circuit breaker 110 is configured to protect the stage 104A from current surges in the multiple phase power signal carried by primary busbars 102 and can be rated for 100 amps in some embodiments. The power capacitors 114 are configured to provide power factor correction, creating a lead current to counteract a lag current caused when a load on the power distribution system in which the power control system 100 is implemented is inductive. The capacitor switching contactor 112 is configured to switch the stage 104A in our out of the power distribution system as instructed by the controller 106.

Each additional stage 104N similarly includes a multiple phase circuit breaker 116, a capacitor switching contactor 118, and one or more power capacitors 120A, 120B, 120C (collectively referred to herein as "power capacitors 120"). Although each of the stages 104 is shown in FIG. 1 with three power capacitors 114 or 120, each stage 104 can alternately include one or two power capacitors or more than three power capacitors. In some embodiments, the controller 106 determines how many of the stages 104 to switch in or out of the power distribution system at any given time, depending on, for instance, the amount of power factor correction desired for the power distribution system at any given time.

In some embodiments, each stage 104A-104N further includes a plurality of secondary busbars 122, 124, respectively. The secondary busbars 122 are configured to couple the power capacitors 114 together in parallel. Similarly, secondary busbars 124 are configured to couple the power capacitors 120 together in parallel. The secondary busbars 122, 124 comprise copper busbars rated at 100 A in some embodiments. Alternately or additionally, power capacitors 114 (and 120) can be coupled together in parallel using busbars or conductive wire rated for more or less than 100 A.

At least one stage 104A further includes a tuned reactor zig-zag transformer 126 coupled between the capacitor switching contactor 112 and power capacitors 114. That is, the tuned reactor zig-zag transformer 126 is configured as both a tuned reactor and a zig-zag transformer, as will be explained in greater detail below. In its capacity as a tuned reactor, the tuned reactor zig-zag transformer 126 is configured to suppress switching damage that would otherwise result from, e.g., current inrush when the power capacitors 114 are switched on. In its capacity as a zig-zag transformer, the tuned reactor zig-zag transformer 126 is configured to suppress voltage and/or current variance in the multiple phase power signal.

Additionally, implementation of the tuned reactor zig-zag transformer 126 in conjunction with the capacitor switching contactor 112 and power capacitors 114 allows the stage 104A to be configured as both a notch filter for harmonic frequency suppression of a particular harmonic frequency, and as a power holding tank circuit to smooth out power variations. In a multi-stage power control system, one or more of the other stages 104N can optionally include a tuned reactor zig-zag transformer 126.

Briefly, the controller 106 is configured to, among other things, control each of the stages 104. For instance, the controller 106 is configured to determine when to switch each stage 104 on or off, depending on the power factor in the power distribution system at any given time. To that end, the controller 106 can receive data from a plurality of probes that measure, for instance, the phase difference between voltage and current in the multiple phase power signal carried on the primary busbars 102. Alternately or additionally, the controller 106 can be configured to count the number of times each stage is switched on and/or off. Alternately or additionally, the controller 106 can be configured to monitor each notch filter and power tank circuit formed by one or more stages 104 of the power control system 100. Alternately or additionally, the controller 106 can be configured to track various electrical parameters for the power distribution system, such as the current, voltage, and/or AC frequency of the multiple phase power signal and/or the power consumed by the power distribution system. Various aspects of the controller 106 will be described in greater detail below.

Although not shown, the power control system 100 and/or a power distribution system in which the power control system 100 is implemented can optionally include one or more passive harmonic filters operatively coupled to the power control system 100 and/or power distribution system. In some embodiments, passive harmonic frequencies tuned to harmonic frequencies above approximately 50 kHz can be coupled to the power distribution system near the source of the harmonic frequencies. The passive harmonic filters can be configured to control extreme power spikes such as may be produced by the power source and/or from events such as lightning. Alternately or additionally, the passive harmonic filters can be configured to suppress harmonic distortion at the prime harmonic frequency up to the thirty-second harmonic frequency. The one or more passive harmonic filters are further configured to protect the power capacitors 114 and in some embodiments can reduce each of the aforementioned harmonic frequency ranges an average of 10%.

In some embodiments, the power control system 100 is configured to handle current needs ranging from 100 amps to 3,000 amps per phase. Although not shown, the power control system 100 can optionally include stand-off insulators to protect the primary busbars 102 and current carrying circuits.

In some embodiments, the power control system 100 can include a fused step down transformer (see FIG. 6A) to convert medium voltage power to low voltage power in order to operate the controller 106 and a fan or other active cooling system. The controller 106 can be configured to monitor the temperature of the power control system 100 and turn the fan or other active cooling system on and off for cooling as needed. In some embodiments, the fan or other active cooling system is configured to move sufficient air to exceed by 300% the anticipated heat value of all internal components of the power control system 100. Alternately or additionally, the power control system 100 can include an air filter to filter outside air for circulation within an enclosure in which the power control system 100 is housed.

Figure 2:
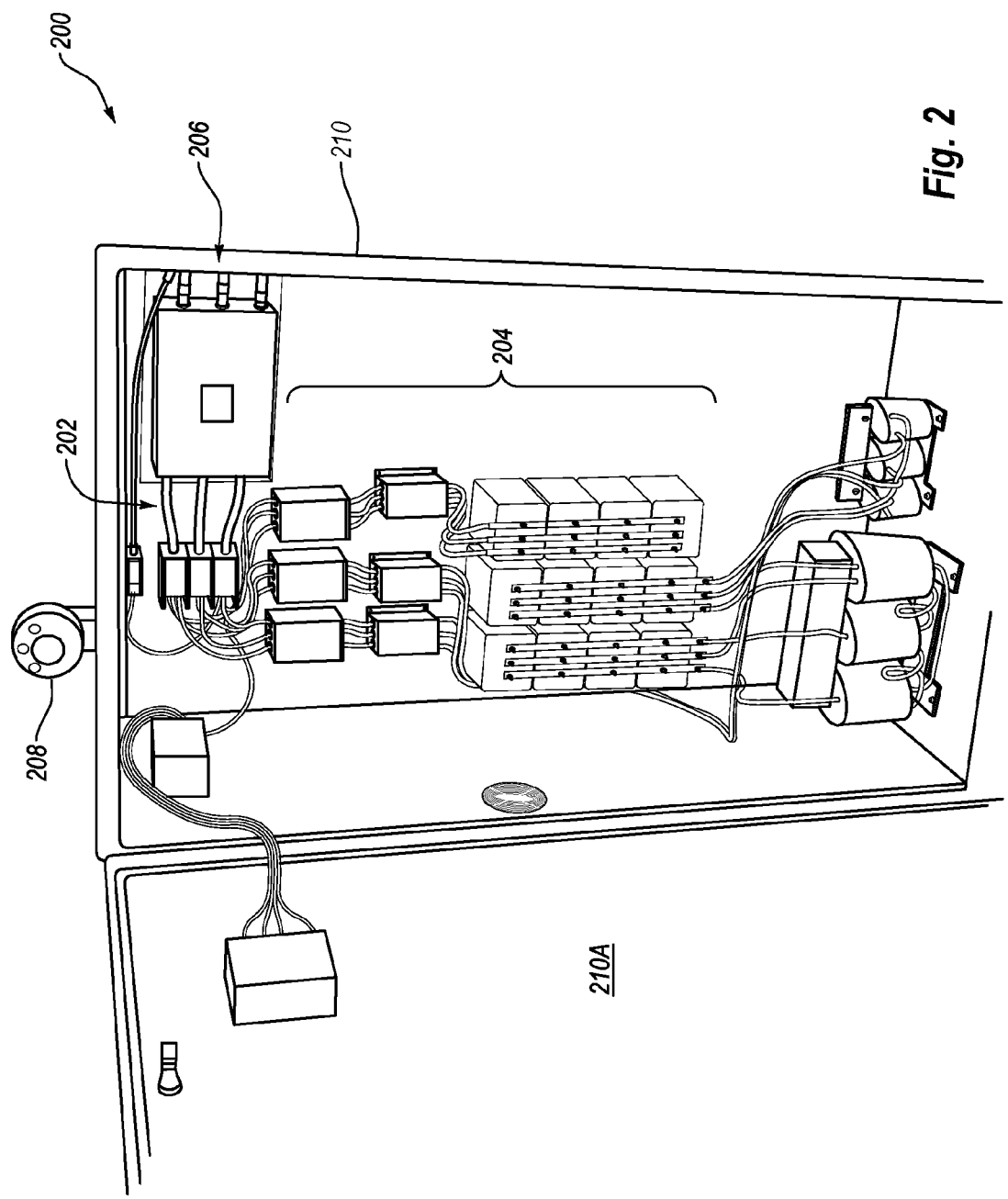
FIG. 2 illustrates a second example embodiment of a power control system according to embodiments of the invention.

With additional reference briefly to FIG. 2, one embodiment of a working power control system 200 is disclosed that may correspond to the power control system 100 of FIG. 1. The power control system 200 includes a plurality of primary busbars 202, three stages 204, and a controller 206. The power control system 200 further includes a passive harmonic filter 208. As shown, the components 202-206 are disposed within a housing 210 that includes a door 210A. Advantageously, the components 202-206 are arranged within the housing in such a way that they are all accessible for service and/or testing at any time by simply opening the door 210A. In some embodiments, the volume enclosed by the housing 210 is 40 cubic feet or less, allowing the power control system 200 to be placed in relatively small spaces not allowed for by conventional power control systems.

Optionally, the power control system 200 can include an on-off switch (not shown) built into the door 210A. Alternately or additionally, the power control system 200 can include a safety switch built into the door 210A that is configured to automatically turn off the power to the power control system 200 when the door 210A is opened or tampered with. The power control system 200 can provide means for bypassing the safety switch if testing of the power control system 200 is desired.

As will be explained in more detail below with respect to FIGS. 7A and 7B, the power control systems 100 or 200 can be implemented in conjunction with one or more active harmonic filters. Such active harmonic filters can be configured to suppress large and extreme harmonic distortion levels. In such embodiments, the controller 106, 206 can be configured to call for and monitor the activity of the one or more active harmonic filters as separate entities or stages within the power control systems 100, 200.

II. Capacitor Switching Contactor

Figure 3:
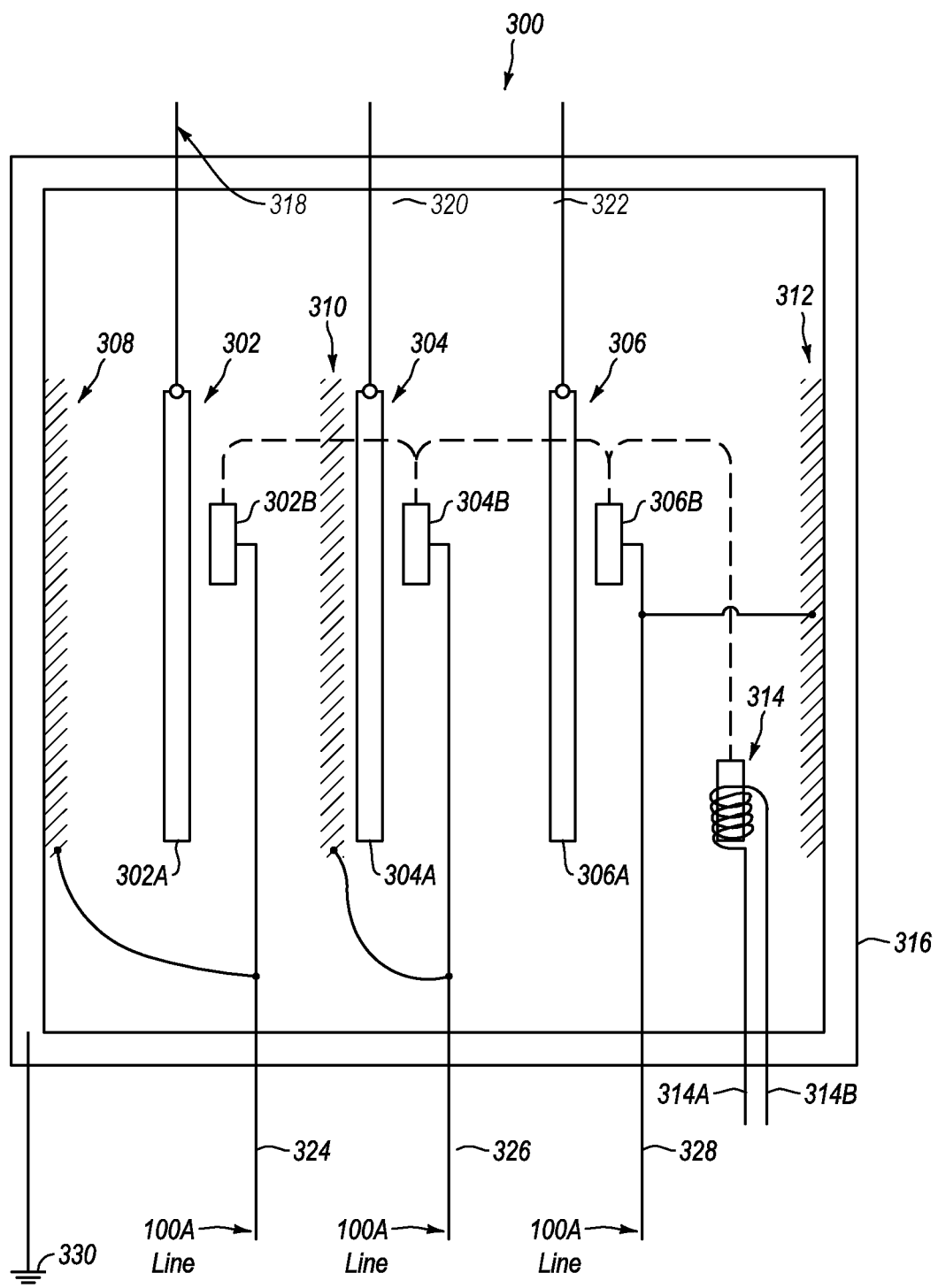
FIG. 3 illustrates an example embodiment of a capacitor switching contactor that can be implemented in one or more stages of the power control systems of FIGS. 1 and 2.

With additional reference to FIG. 3, aspects of an example capacitor switching contactor 300 will be disclosed. The capacitor switching contactor 300 may correspond to the capacitor switching contactors 112, 118 of FIG. 1 and can be rated at 600 volts and 100 amps in some embodiments. As shown, the capacitor switching contactor 300 includes a plurality of contact point sets 302, 304, 306, a plurality of arc chutes 308, 310, 312, a solenoid 314, and an insulating enclosure 316.

In some embodiments, the capacitor switching contactor 300 includes one contact point set and arc chute for each phase of a multiple phase power signal carried by the primary busbars 102 of FIG. 1. Each contact point set 302, 304, 306 includes a first contact point 302A, 304A, 306A and a second contact point 302B, 304B, 306B. The first contact points 302A, 304A, 306A are configured to be coupled to the primary busbars 102 of FIG. 1 via wires 318, 320, 322. The second contact points 302B, 304B, 306B are configured to be coupled to the power capacitors 114 (either directly or indirectly via the tuned reactor zig-zag transformer 126) via wires 324, 326, 328. Alternately or additionally, the coupling of the first contact points 302A-306A and of the second contact points 302B-306B to the primary busbars 102 and power capacitors 114 can be reversed. In some embodiments, the wires 318-328 are rated for approximately 100 amps.

Each contact point set 302-306 is configured to open and close an electrical connection between two or more components. As used herein, an electrical connection between two components is "open" when there is effectively an infinite resistance between the two components. In contrast, an electrical connection between two components is "closed" when there is a low resistance between the two components.

For instance, contact point set 302 may be configured to open and close an electrical connection between primary busbar 102A and a terminal on each of power capacitors 114 in FIG. 1. Similarly, contact point set 304 can be configured to open and close an electrical connection between primary busbar 102B and a terminal on each of power capacitors 114, while contact point set 306 can be configured to open and close an electrical connection between primary busbar 102C and a terminal on each of power capacitors 114.

In some embodiments, the contact point sets 302-306 comprise a hard metal such as titanium metal that is characterized by a relatively large resistance to offset capacitor inrush current when the contact point sets 302-306 close the electrical connection between power capacitors 114 and primary busbars 102 in FIG. 1.

As will be appreciated by those skilled in the art, when an electrical connection is opened or closed by a contact point set, pitting and other damage can occur to the contact points as electrical discharge current can arc between the two contact points immediately before they come in contact in the case of closing the electrical connection, or immediately after they break contact in the case of opening the electrical connection. To reduce such pitting and other damage, embodiments of the capacitor switching contactor 300 include arc chutes 308-312. Arc chutes 308-312 are positioned proximate contact point sets 302-306, respectively. When the contact point sets 302-306 are opened and closed, arc chutes 308-312 are configured to receive any electrical discharge current generated by opening and closing the contact point sets 302-306 to prevent pitting and other damage to contact point sets 302-306. Each of the second contact points 302B-306B is electrically coupled to a corresponding arc chute 308-312

According to some embodiments of the invention, each second contact point 302B-306B is mechanically coupled to solenoid 314. The solenoid 314 is configured to impart forces sufficient to move second contact points 302B-306B away from and towards first contact points 302A-306A to open and close the contact point sets 302-306 in response to signals received from the controller 106 of FIG. 1 via control wires 314A and 314B. In some embodiments, the solenoid 314 may comprise a 120 volt coil configured to close the second contact points 302B-306B and one or more springs configured to open the second contact points 302B-306B, or vice versa.

The contact point sets 302-306, arc chutes 308-312, and solenoid 314 are housed within insulating enclosure 316. In some embodiments, the insulating enclosure 316 is configured to form an electromagnetic interference ("EMI") shield around the components 302-314 to substantially prevent electromagnetic radiation ("EMR") from entering or leaving the insulating enclosure 316. To form the EMI shield, the insulating enclosure 316 may comprise plastic with an Aluminum thread or mesh embedded therein. Alternately or additionally, other suitable materials can be implemented for the insulating enclosure 316. As shown in FIG. 3, the insulating enclosure 316 can be coupled to ground 330

Although not shown, the capacitor switching contactor 300 can optionally include a first plurality of tuned choke coils coupled to the wires 318, 320, 322, a second plurality of tuned choke coils coupled to the wires 324, 326, 328, and a second plurality of contact point sets coupled between the first plurality of tuned choke coils and second plurality of tuned choke coils. Each of the second plurality of contact point sets can be rated for 10 amps with a nominal voltage rating of 250 volts in some embodiments and can include a contact point mechanically coupled to the solenoid 314.

In some embodiments, immediately before closing and/or immediately after opening the first plurality of contact point sets 302-306, the solenoid 314 can be configured to close the second plurality of contact point sets for a short time (e.g., on the order of $\frac{1}{60}^{th}$ of a second) to suppress inrush and/or outrush current. For the brief time that the second plurality of contact point sets are closed and for each phase of the multiple phase power signal, one of the first plurality of tuned choke coils aligns with one of the second plurality of tuned choke coils to dampen inrush and/or outrush current as the power capacitors 114 are coupled to or decoupled from the primary busbars 102 in FIG. 1. The first and second plurality of tuned choke coils can be tuned to dampen frequencies ranging from 40-70 cycles per second ("Hz") in some embodiments. Whereas British power distribution systems operate at about 50 Hz and North American power distribution systems operate at about 60 Hz, the first and second plurality of tuned choke coils can dissipate much of the inrush and outrush currents and voltages typical of switching power capacitors. Alternately or additionally, the first and second plurality of tuned choke coils can be electrically protected by insulating covers made of, for example, plastic.

Although not shown, in some embodiments the capacitor switching contactor 300 can include a common rail clip designation to facilitate fast connect and disconnect of the capacitor switching contactor 300 to the power control systems 100, 200 of FIGS. 1 and 2. Alternately or additionally, one or more of the wires 318-328 can terminate with or otherwise include wire contact points configured to couple to stranded or solid wire to electrically couple the capacitor switching contactor 300 to components of the power control system 100 or 200. The stranded or solid wire can be rated at 100 amps and 600 volts in some embodiments.

III. Power Capacitors

Figure 4A:
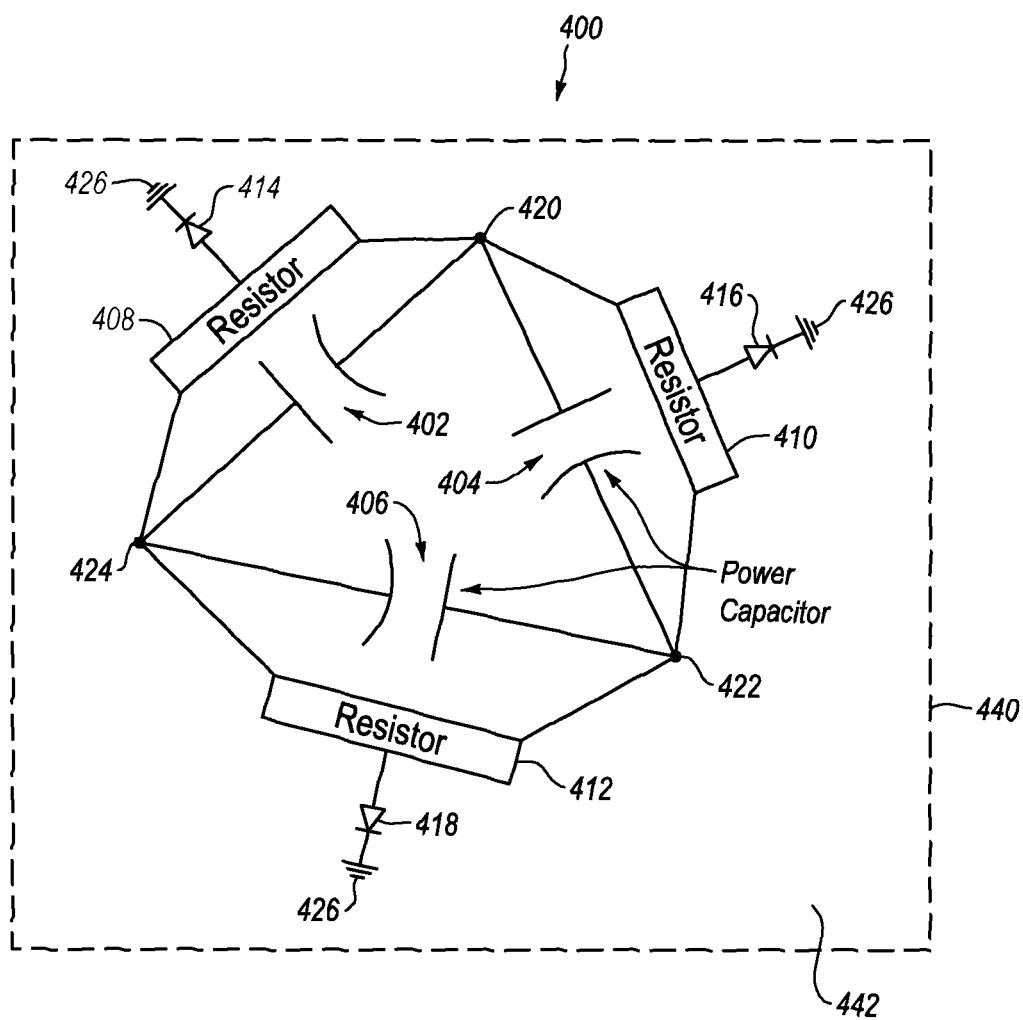
FIG. 4A illustrates an example embodiment of a power capacitor that can be implemented in one or more stages of the power control systems of FIGS. 1 and 2.
Figure 4B:
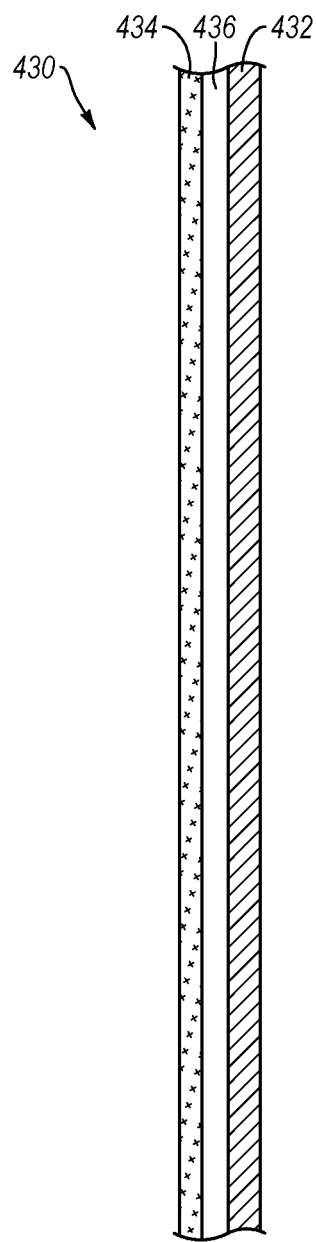
FIG. 4B illustrates an example embodiment of a plurality of layers that can be implemented in balanced capacitors of the power capacitor of FIG. 4A.

With additional reference to FIGS. 4A and 4B, aspects of an example power capacitor 400 will be disclosed. The power capacitor 400 may correspond to one or more of the power capacitors 114, 120 of FIG. 1. Alternately or additionally, the power capacitor 400 can be implemented in environments other than the power control system 100 of FIG. 1. Alternately or additionally, the power capacitor 400 can be rated to handle 150 amps at up to 600 volts without failure in some embodiments and/or can be rated to operate at AC power frequencies between 45 Hz and 65 Hz. As shown in FIG. 4A, the power capacitor 400 includes three balanced capacitors 402, 404, 406, three resistors 408, 410, 412, and three diodes 414, 416, 418.

Each of the three balanced capacitors 402-406 is balanced with the others, insofar as each of the balanced capacitors is characterized by the same capacitor ratings (e.g., the same kVAr ratings). Further, each of the three balanced capacitors 402-406 can comprise a self-repairing capacitor, as will be explained in greater detail below. Further, the three balanced capacitors 402-406 are arranged in a delta configuration, meaning each of capacitors 402-406 is coupled to two adjacent capacitors and three contact points 420, 422, 424 are interposed between the three capacitor 402-406, a different contact point being disposed between each pair of adjacent capacitors. The delta configuration of the balanced capacitors 402-406 allows the power capacitor 400 to be implemented in a notch filter in conjunction with a tuned reactor zig-zag transformer 126, if desired.

Each of the resistors 408-412 can comprise a center tap resistor that includes two inputs and one output. Each input of each resistor 408-412 is coupled to one of the contact points 420-424. For instance, the inputs of resistor 408 are coupled to contact points 420 and 424; the inputs of resistor 410 are coupled to contact points 420 and 422; the inputs of resistor 412 are coupled to contact points 422 and 424. Each output of each resistor 408-412 is coupled to one of the diodes 414-418, respectively.

Each of the diodes 414-418 can comprise a power diode. An input of each diode 414-418 is coupled to an output of resistor 408-412, respectively, while an output of each diode 414-418 is coupled to ground 426. When the electrical connection between the power capacitor 400 and the primary busbars 102 of FIG. 1 is closed, power is stored by the power capacitor 400. When the electrical connection is opened, the diodes 414-418 allow current to flow to ground 426, safely discharging the power capacitor 400.

In some embodiments, each of the balanced capacitors 402-406 comprises a plurality of layers 430, as shown in the cross-sectional side view of the plurality of layers 430 in FIG. 4B. Alternately or additionally, the plurality of layers 430 can be rolled to form one or more of the balanced capacitors 402-406. The plurality of layers 430 includes a foil layer 432 configured to store electrical charge, an insulation layer 434 configured to insulate the foil layer 432, and a repairing layer 434 disposed between the foil layer 432 and insulation layer 434 and configured to self-repair the foil layer 432 and/or insulation layer 434 in the event of damage.

The foil layer 432 can comprise anodized foil in some embodiments to increase the current failure value of the balanced capacitors 402-406. Alternately or additionally, the insulation layer 434 can comprise biaxially-oriented polyethylene terephthalate (boPET) polyester film, also commonly known as Mylar or Melinex. The insulation layer 434 can be coated with a polycarbonate film to increase the voltage and/or frequency resiliency of the balanced capacitors 402-406 to damage.

To prevent the balanced capacitors 402-406 from shorting out in the event of damage, the plurality of layers 430 include repairing layer 434. Generally, capacitors can short out when a hole forms in an insulation layer and/or foil layer. To prevent shorting out, the repairing layer 436 is configured to fill any holes formed in the foil layer 432 and/or insulation layer 434. For instance, the repairing layer 436 may comprise a thermoplastic that exists in solid form at the power capacitor's 400 normal operating temperatures of about 30° C.-130° C. and that exists in liquid form at around 400° C. Upon formation of a hole in the foil layer 432 and/or insulation layer 434, and electrical discharge current can discharge through the hole, heating a portion of the repairing layer 436 in the vicinity of the hole to around 400° C. The high temperature liquefies the portion of the repairing layer 436 in the vicinity of the hole, and the liquefied portion of the repairing layer 436 flows into the hole, extinguishes the electrical discharge current, and solidifies as the temperature drops to the power capacitor's 400 normal operating temperature.

Returning to FIG. 4A, the power capacitor 400 can further include a capacitor housing 440 that may comprise medium grade steel, such as 22 gauge steel, in some embodiments. Alternately or additionally, the capacitor housing 440 may comprise other suitable materials. The capacitor housing 440 is configured to prevent any faults within the capacitor housing 440 from escaping and/or causing damage to components outside the capacitor housing 440.

The capacitor housing 440 defines a cavity in which the balanced capacitors 402-406, resistors 408-412 and diodes 414-418 are disposed. The capacitor housing 440 may comprise a rectangular or square box shape in some embodiments to facilitate stacking multiple power capacitors 400 together.

Alternately or additionally, the power capacitor 400 can include a fluid 442 substantially filling volume in the cavity not occupied by the balanced capacitors 402-406, resistors 408-412 and diodes 414-418. In some embodiments, the fluid 442 comprises refined vegetable oil, dielectric oil, FR3 dielectric oil, or the like. The fluid 442 may be substantially non-flammable at high temperatures (e.g., above the normal operating temperatures of the power capacitor 400) and non-reactive to over currents. Alternately or additionally, in some embodiments the fluid 442 can be configured to naturally decompose without incineration, facilitating easy and environmentally-friendly disposal.

Each of the three contact points 420-424 is coupled to a corresponding terminal disposed on the exterior of the capacitor housing 440. The terminals on the exterior of the capacitor housing 440 can be arranged with sufficient space in between to prevent any voltage or power exchange between the terminals at operating voltages up to and including 600 volts in some embodiments. For instance, in some embodiments the terminals on the exterior of the capacitor housing 440 are spaced at least an inch apart from each other.

In some embodiments of the invention, the power capacitor 400 can be rated for at least $10 \times 10^3$ volt-ampere reactive power (VAr), or 10 kVAr. Alternately or additionally, the power capacitor 400 can be rated between 10 kVAr and 25 kVAr.

IV. Tuned Reactor Zig-Zag Transformer

Figure 5:
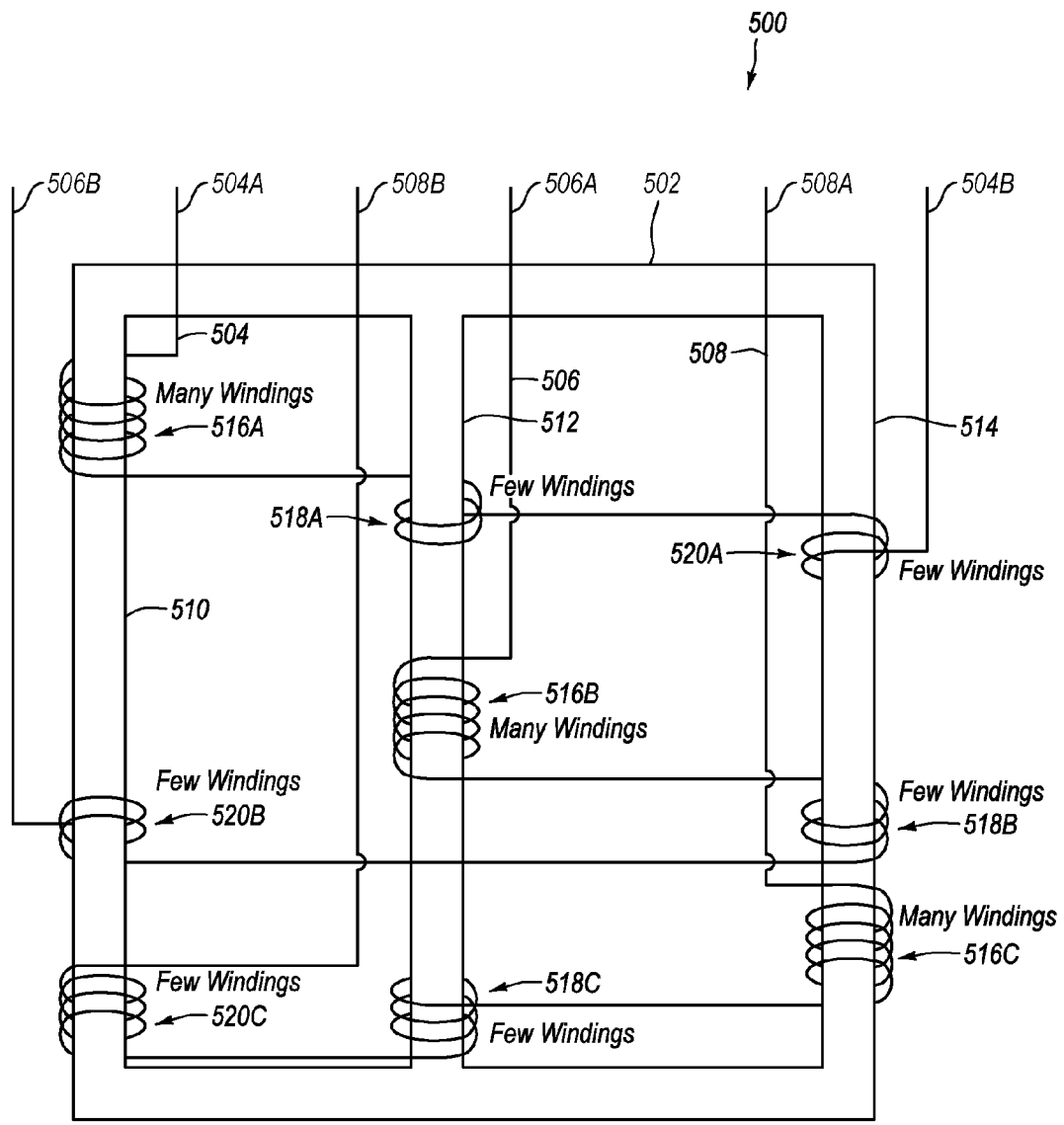
FIG. 5 illustrates an example embodiment of a tuned reactor zig-zag transformer that can be implemented in one or more stages of the power control systems of FIGS. 1 and 2.

With additional reference to FIG. 5, aspects of an example tuned reactor zig-zag transformer 500 will be disclosed. The tuned reactor zig-zag transformer 500 may correspond to the tuned reactor zig-zag transformer 126 of FIG. 1. As mentioned above, at least one of the stages 104 of power control system 100 can include a tuned reactor zig-zag transformer, although not required in every stage 104. Alternately or additionally, the tuned reactor zig-zag transformer 500 can be implemented in environments other than the power control system 100 of FIG. 1. Further, in some embodiments the tuned reactor zig-zag transformer is configured to handle currents as high as 100 amps.

The tuned reactor zig-zag transformer 500 includes a core 502, and a plurality of wires 504, 506, 508. Each wire 504-508 is configured to carry a different phase of the multiple phase power signal carried by the primary busbars 102 of FIG. 1. Further, each wire 504, 506, 508 includes an input 504A, 506A, 508A, and an output 504B, 506B, 508B. With combined reference to FIGS. 1 and 5, for example, inputs 504A, 506A and 508A are configured to be coupled to, respectively, primary busbars 102A, 102B and 102C via capacitor switching contactor 112, while outputs 504B, 506B and 508B are configured to be coupled to power capacitors 114.

The core 502 can comprise laminated iron with sufficient size to prevent magnetic saturation during operation with alternating currents of approximately 100 amps on wires 504-508. For instance, in some embodiments the core 502 weighs at least 70 pounds. Alternately or additionally, the core 502 can weigh more or less than 70 pounds. For instance, in some embodiments the core can weight anywhere from 50-80 pounds. The relatively large size of the core 502 compared to cores used in conventional zig-zag transformers is configured to prevent magnetic saturation of the tuned reactor zig-zag transformer 500 during operation at or near 100 amps.

As shown in FIG. 5, the core 502 comprises three coupled cores 510, 512 and 514. Each of the wires 504-508 includes a plurality of windings disposed about a portion of each of the coupled cores 510-514. For instance, wire 504 includes a first plurality of windings 516A, a second plurality of windings 518A, and a third plurality of windings 520A disposed about cores 510, 512, and 514, respectively. Wire 506 includes a first plurality of windings 516B, a second plurality of windings 518B, and a third plurality of windings 520B disposed about cores 512, 514, and 510, respectively. Wire 508 includes a first plurality of windings 516C, a second plurality of windings 518C, and a third plurality of windings 520C disposed about cores 514, 512, and 510, respectively.

Each of the first plurality of windings 516A, 516B, 516C (collectively referred to herein as "first plurality of windings 516") can include the same number of turns a in some embodiments. Alternately or additionally, each of the second plurality of windings 518A, 518B, 518C (collectively referred to herein as "second plurality of windings 518") and third plurality of windings 520A, 520B, 520C (collectively referred to herein as "third plurality of windings 520") can include the same number of turns b. The number of turns a of the first plurality of windings 516 can be larger than the number of turns b of the second and third plurality of windings 518, 520 in some embodiments. Further, each of the first plurality of windings 516 is wound around the coupled iron cores 510-514 in one direction, while both the second plurality of windings 518 and third plurality of windings 520 are wound around the coupled iron cores 510-514 in the opposite direction.

In operation, the current carried by each of wires 504-508 alternates at 60 cycles per second in a 60 Hz 3-phase AC environment. During each cycle of each phase, the first plurality of windings 516 strongly magnetizes a corresponding one of the coupled cores 510-514, while the second plurality of windings 518 and third plurality of windings 520 weakly magnetize corresponding coupled cores 510-514. With 3 phases and an AC frequency of 60 Hz, the core 502 changes magnetic condition 180 times per second in a round-robin fashion.

The high-frequency change in magnetic condition of the core 502 forces the tuned reactor zig-zag transformer 500 to stabilize at a common ground between the 3-phases of the power signal. More particularly, because tuned reactor zig-zag transformer 500 has an inductive reactance that has the ability to transfer voltage between wires 504-508, the forced and rapid inductive reaction of the tuned reactor zig-zag transformer 500 caused by the high-frequency changes in magnetic condition of the core 502 tends to resist any fluctuation in voltage and current between the phases of the power signal carried by wires 504-508. Accordingly, the tuned reactor zig-zag transformer 500 is configured to suppress voltage and current variations in the 3-phase power signal when the tuned reactor zig-zag transformer 500 is coupled to the primary busbars 102 carrying a 3-phase power signal.

The number of turns a and b of the first, second, and third plurality of windings 516, 518, 520 and/or the size of the core 502 can be selected in some embodiments to tune the tuned reactor zig-zag transformer 500 to suppress a particular harmonic frequency of the multiple phase power signal. For instance, the number of turns a and b and/or size of the core 502 can be selected to tune the tuned reactor zig-zag transformer 500 to suppress the third harmonic frequency of the multiple phase power signal. Alternately or additionally, the tuned reactor zig-zag transformer 500 can be tuned to suppress some other harmonic frequency, such as the fifth or seventh harmonic frequency.

According to some embodiments of the invention, the tuning of the tuned reactor zig-zag transformer 500 is approximately 1.2 degrees off a particular harmonic frequency to create a notch filter. As used herein, a "notch filter" refers to a plurality of inter-related capacitors (e.g., power capacitors 114 of FIG. 1) coupled against inductive coils (e.g., the plurality of windings 516-520) that are tuned to the capacitors (e.g., by selecting the appropriate number of turns a, b) to attenuate signal frequencies within a narrow range of signal frequencies.

As already mentioned, the tuned reactor zig-zag transformer 500 can be tuned to approximately 1.2 degrees off a target frequency in some embodiments to avoid creating a short circuit. In particular, if the reactance $X_{inductor}$ of an inductive coil (e.g., plurality of windings 516-520) is equal to the reactance $X_{capacitor}$ of a capacitor (e.g., power capacitors 114) coupled to the inductive coil, a short circuit condition is created:

$$X_{inductor} \times X_{capacitor} = 0 \text{ ohms} \qquad \text{Eq. (1)}$$

The existence of such a short circuit condition in an active circuit can cause explosions or otherwise damage equipment, such as the power control system 100 of FIG. 1. To avoid such a short circuit condition, the tuned reactor zig-zag transformer 500 can be tuned to 1.2 degrees off a particular harmonic frequency.

Furthermore, the tuned reactor zig-zag transformer 500 operates in conjunction with the power capacitors 114 to form a power holding tank circuit. In operation, the power holding tank circuit is configured to smooth out power variations by resisting power sags via the power capacitors 114 and by resisting power surges via the tuned reactor zig-zag transformer 500

V. Controller

Figure 6A:
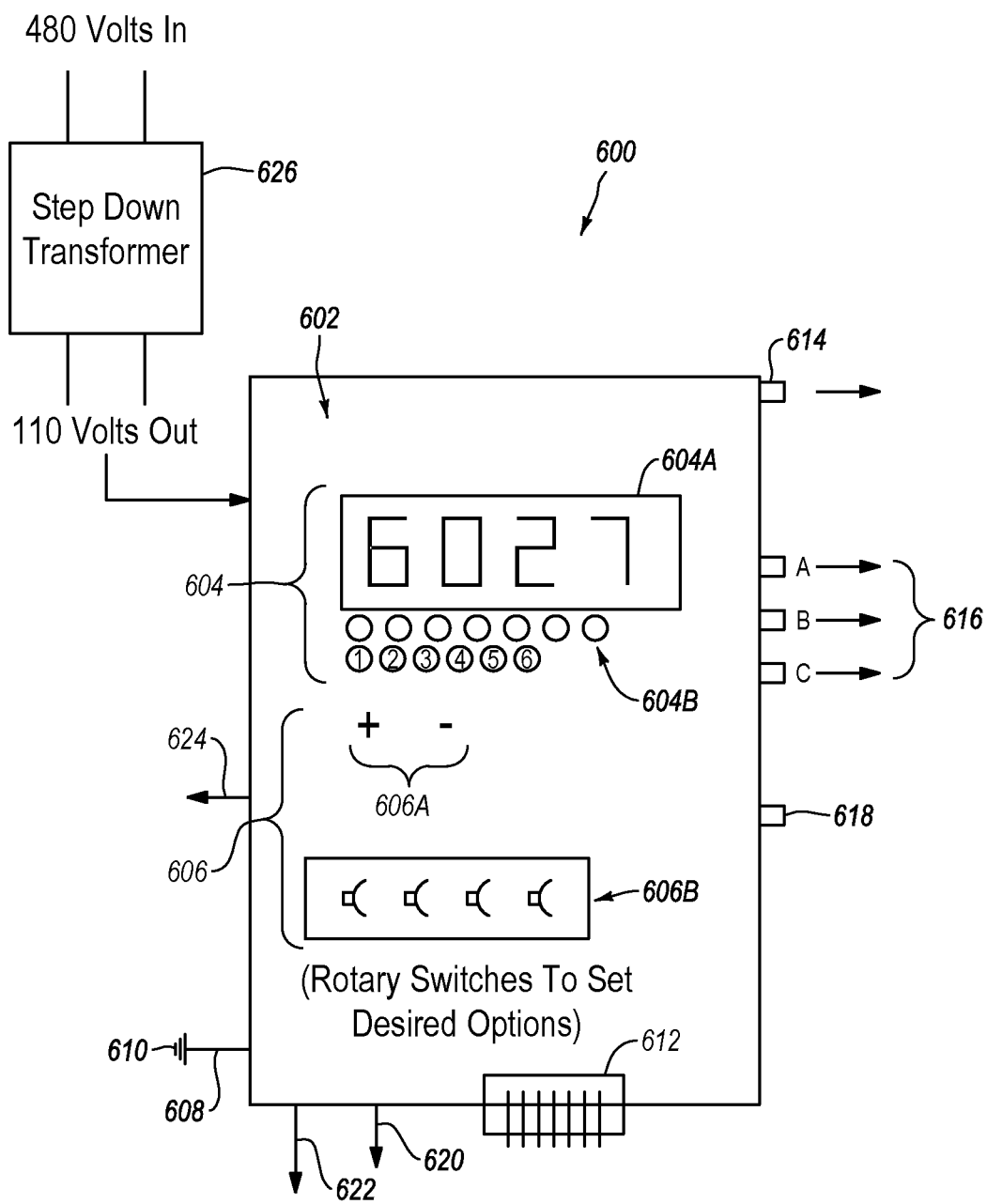
FIGS. 6A-6C illustrate an example embodiment of a controller and components thereof that can be implemented in the power control systems of FIGS. 1 and 2.
Figure 6B:
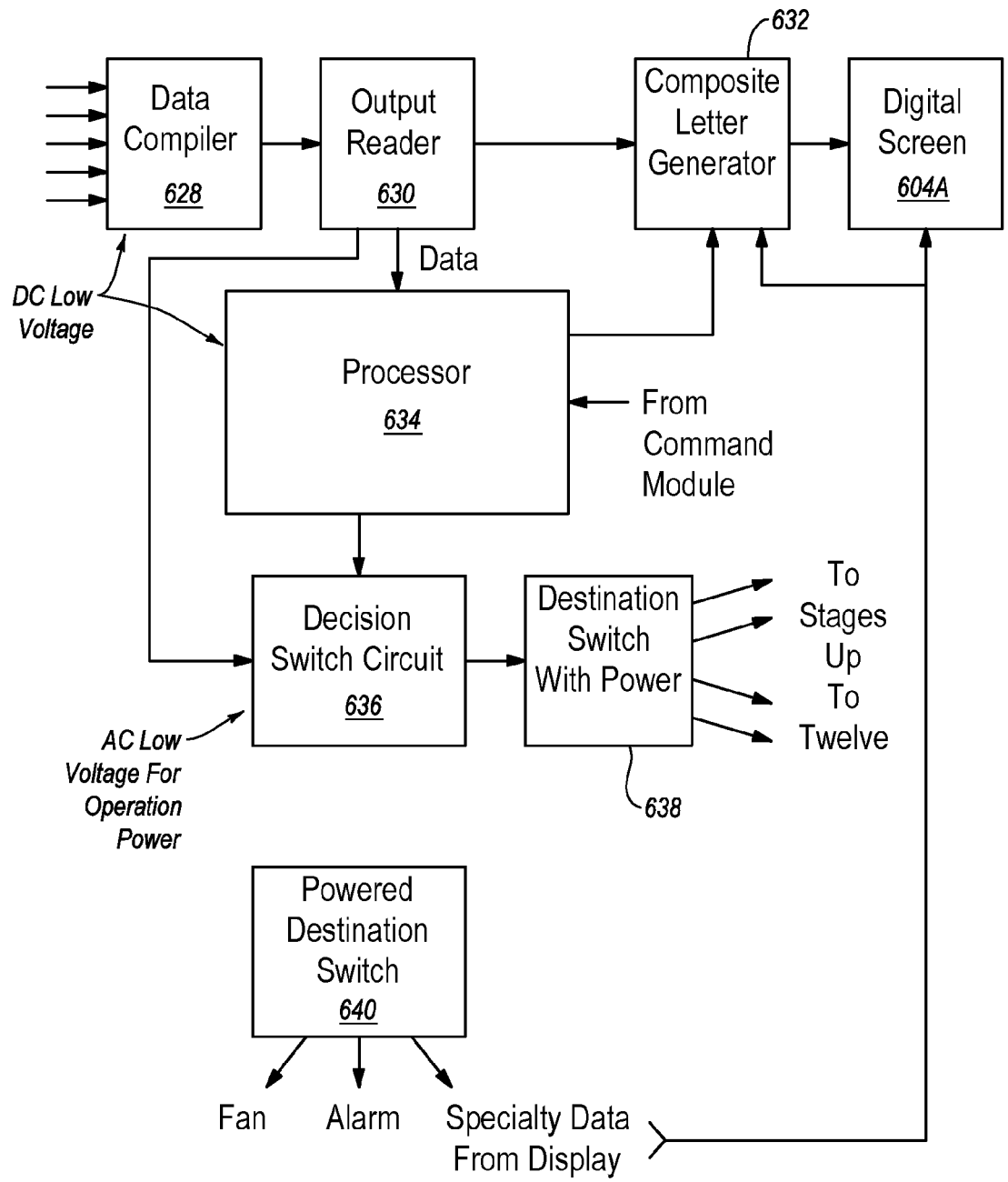
Figure 6C:
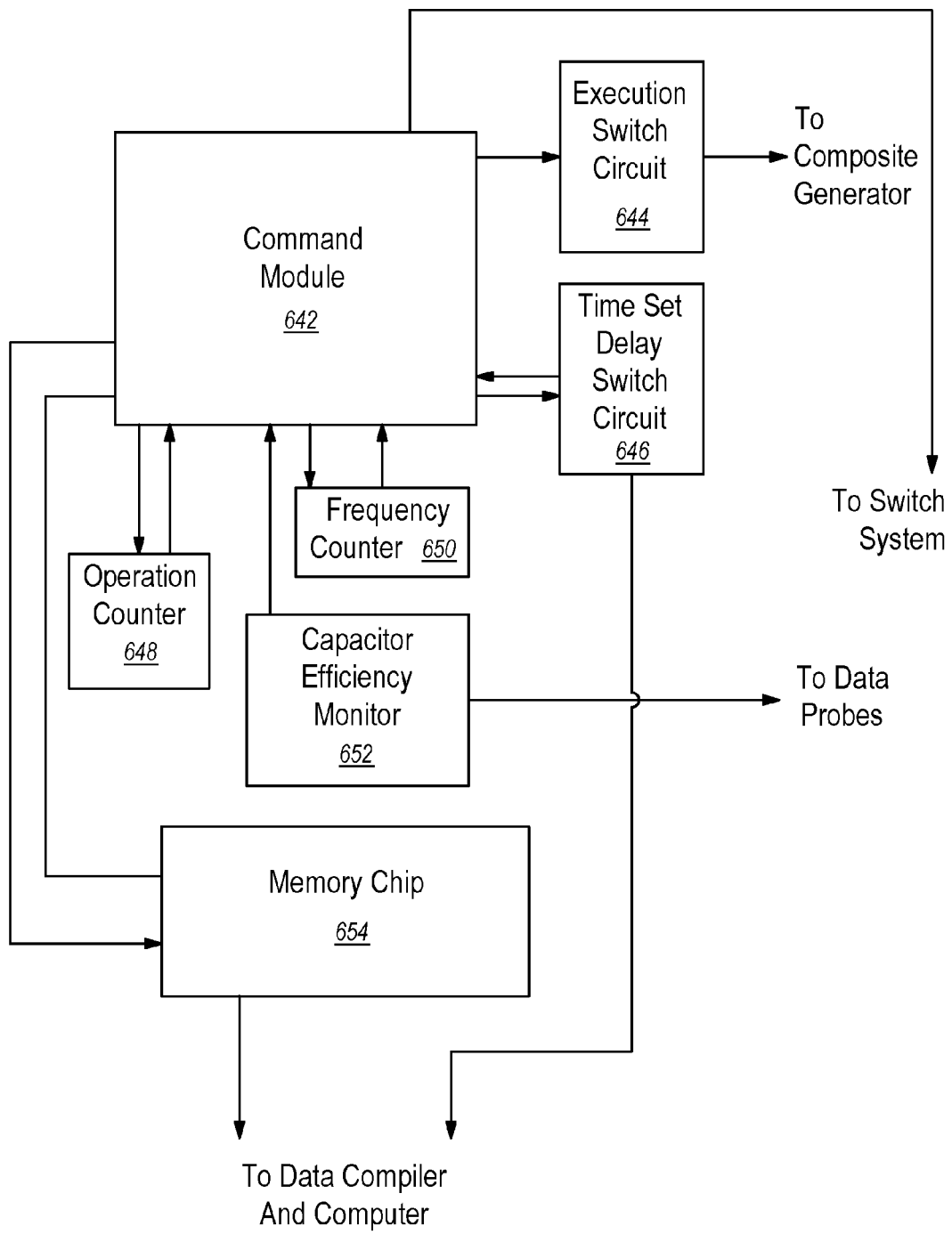

With additional reference to FIGS. 6A-6C, aspects of an example controller 600 will be disclosed. The controller 600 may correspond to the controller 106 of FIG. 1 and can be configured to measure power factor in a power distribution system and to act upon software to switch stages 104 on or off to provide power factor correction. In some embodiments, the controller 600 can be configured to monitor and operate a power control system 100 for a power distribution system having any voltage configuration between about 90 volts and 600 volts.

As shown in FIG. 6A, the controller 600 includes a user interface 602 comprising output means 604 and input means 606. The controller 600 further includes a case strap 608 configured to couple the controller 600 to ground 610, a multi-pin port 612 configured to send and receive data to and from a remote node, a plurality of probe feeds 614, 616 configured to measure various electrical parameters of a power distribution system, a reference voltage 618, and one or more control lines 620, 622, 624. Further, in some embodiments the controller 600 may be configured to receive 110-volt power from a step down transformer 626 coupled to a 480-volt power source.

The output means 604 can include one or more of a digital display 604A and/or stage indicator lights 604B. The digital display 604A may be configured to display electrical data for a power distribution system in which the power control system 100 of FIG. 1 is implemented. The electrical data may include, for instance, power factor error as cosine theta, voltage, total current being consumed, active calculated power (in watts), total reactive power (in watts), kVAr ratings output, stage capacitor ratings for each of stages 104, and frequency of the multiple phase power signal, and the like or any combination thereof.

In some embodiments, the output means 604 include up to twelve stage indicator lights 604B, one each corresponding to one of twelve stages 104 in the power control system 100 of FIG. 1, for instance. Alternately or additionally, there may be more or less than twelve stage indicator lights 604B. Alternately or additionally, there may be more stage indicator lights 604B than stages 104 in the power control system 100 of FIG. 1. In some embodiments, the controller 600 is configured to track which stages are in use at any given time and to display which of the stages are in use via stage indicator lights 604B. Alternately or additionally, the controller 600 can be configured to identify any stages 104 that include one or more failed components in order to avoid switching the failed stage on and damaging the power control system 100 or a user.

The input means 606 may include stage selectors 606A and rotary switches 606B. The stage selectors 606A can be used to select a particular one of the stage indicators 604B corresponding to a particular stage 104 of the power control system 100 of FIG. 1, for example. When a particular stage indicator 604B has been selected using stage selectors 606A, the digital display 604A may display certain electrical parameters for the corresponding stage 104. Alternately or additionally, when a particular stage indicator 604B has been selected, the rotary switches 606B can be used to program certain actions, such as a timed delay for a particular stage.

Alternately or additionally, a user can use one or more of input means 606 to set a particular power factor target or preset thermal dynamics for the power control system 100 if FIG. 1. Alternately or additionally, a user can use input means 606 to program the controller 600 to ignore and not use one or more of stages 104.

The multi-pin port 612 can be configured to send data collected and/or generated by the controller 106 to a remote node, such as a computer or telephone. Alternately or additionally, the multi-pin port 612 can be configured to receive instructions from the remote node. In some embodiments, the multi-pin port 612 implements two-wire telephone telemetry, nine-pin computer contact methods, FireWire interface, and/or standard fiber optics methods for communicating with the remote node.

The probe feeds 614, 616 are configured to measure various electrical parameters for a power distribution system in which the controller 600 is implemented. For instance, the probe feed 614 can be configured to measure the current of a multiple phase power signal; in some embodiments, probe feed 614 can be coupled to a single one of the primary busbars 102 of FIG. 1. In some embodiments, the probe feed 614 comprises a current transformer probe feed. Alternately or additionally, probe feeds 616 can be configured to measure the voltage of each phase of the multiple phase power signal and can be coupled one each to a different one of the primary busbars 102 of FIG. 1. Although not shown, the controller 600 can alternately or additionally receive temperature data for the controller 600 and/or power control system 100.

The control lines 620-624 can be configured to send control signals that operate the power control system 100 of FIG. 1. For instance, control line 620 can be coupled to a fan or other active cooling system to allow the controller 600 to turn the fan or other active cooling system on or off for cooling the power control system 100. The controller 600 may turn on the fan, for example, if received temperature data indicates that the controller 600 or power control system 100 is operating above the preset thermal dynamics set by the user.

Alternately or additionally, control line 622 may comprise one or more stage-specific control lines, each of the one or more stage-specific control lines 622 coupled to a different one of stages 104 to allow the controller 600 to turn the stages 104 on or off for power factor correction.

Alternately or additionally, control line 624 can be coupled to an alarm circuit in the controller 600 and an output device such that when the alarm circuit is activated, the controller 600 can communicate certain parameters to a user through the output device. For instance, the controller 600 can be configured to track the temperature of the power control system 100 and if the temperature ever exceeds a particular value, the alarm circuit can be triggered to send an alarm to the user.

With additional reference to FIGS. 6B and 6C, the controller 600 can additionally include a data compiler 628, output reader 630, composite letter generator 632, processor 634, decision switch 636, stage destination switch 638, and second destination switch 640. As shown in FIG. 6C, the controller 600 further includes a command module 642 coupled to the processor 634, an execution switch 644 coupled to the composite letter generator 632, a time set delay switch 646, an operation counter 648, a frequency counter 650, a capacitor efficiency monitor 652, and a non-volatile memory chip 654. The time set delay switch 646 is coupled to the data compiler 628 and the memory chip 656 is coupled to the processor 634.

As best explained with reference to FIG. 6B, the data compiler 628 can be configured to translate source code stored in memory chip 654 and/or received from a user or remote node via command module 642 into object code executable by the processor 634. In this example, the out put reader 630 can be configured to receive the object code and forward it to the processor 634. The object code executed by the processor 634 can result in the processor 634 instructing the composite letter generator 632 to generate one or more alphanumeric values for display on the digital screen 604A.

Alternately or additionally, the data compiler 628 can be configured to collect data from the power distribution system. The output reader 630 can be configured to receive the data collected by the data compiler 628 and to identify some or all of the collected data to display on the digital screen 604A. The composite letter generator 632 can be configured to receive the data identified for display and to generate one or more alphanumeric values for display on the digital screen 604A that are representative of the data received from the output reader 630.

In some embodiments, execution of the object codes causes the processor 634 to send signals to the decision switch circuit 636, which analyzes the signal to determine whether the signals are intended for one or more of the stages 104 of FIG. 1 via stage destination switch 638, or are intended for one or more other destinations via second destination switch 640. For instance, the signal received from the processor 634 may comprise a signal to switch one of stages 104 on or off. Alternately or additionally, the signal received from the processor 634 may comprise a signal to switch the fan or other active cooling system on or off, or a signal to turn an alarm on or off, or a signal to display certain data on the digital display 604A.

If the signal received from the processor 634 is intended for one or more of the stages 104 of FIG. 1, decision switch 636 forwards the signal to stage destination switch 638, which identifies the intended destination stage and forwards the signal to the intended destination stage. In this example, the signal may be configured to either switch the destination switch on or off. If the signal received from the processor 634 is intended for one or more other destinations, the decision switch 636 forwards the signal to second destination switch 640, which identifies the intended destination (e.g., fan, alarm, digital display) and forwards the signal to the intended destination.

As best explained with reference to FIG. 6C, the command module 642 is configured to allow a user to access data stored on memory chip 654 and/or received from data probes in the power distribution system. Alternately or additionally, the command module 642 can be configured to receive user input in programming certain parameters of the controller 600, such as a target power factor, a timed delay for switching stages, a target operating temperature, exclusion of one or more of stages 104, or the like or any combination thereof. Such programming instructions can be stored in memory chip 654 and/or can be executed by execution switch 644. Time set delay switch 646 can be configured to implement a timed delay for switching stages.

Frequency counter 650 can be configured to count the AC frequency of the multiple phase power signal. Operation counter 648 can be configured to count one or more parameters, such as the number of times that each of stages 104 of FIG. 1 is switched on, switched off, or both. In some embodiments, the operation counter 648 can count up to 10 million. Capacitor efficiency monitor 652 can be configured to track capacitor values for the power capacitors 114, 120 of FIG. 1, for example. The data generated by frequency counter 650, operation counter 648, and capacitor efficiency monitor 652 may include AC frequency of the multiple phase power signal, switching count per stage, and/or capacitor proficiency.

This data can be stored in memory chip 654 and/or reported to a user via digital display 604A and/or multi-pin port 612, for example.

The memory chip 654 can comprise electrically erasable programmable read-only memory ("EEPROM") in some embodiments. Alternately or additionally, the memory chip 654 can comprise other non-volatile or volatile memory. Alternately or additionally, the controller 600 can include a separate volatile memory chip in addition to the memory chip 654. In some embodiments, the memory chip 654 can be configured to store data collected from the power distribution system, and/or data generated by performing calculations using the collected data. Alternately or additionally, the memory chip 654 can be configured to store target values, such as target operating temperature and/or target power factor, as well as other parameters.

In some embodiments of the invention, operations such as stage switching can be performed automatically by the controller 600 when relevant conditions are detected by the controller 600. Alternately or additionally, the controller 600 may include a manual override allowing a user to determine when to perform operations that are normally performed automatically by the controller 600.

VI. Active Harmonic Filter

Figure 7A:
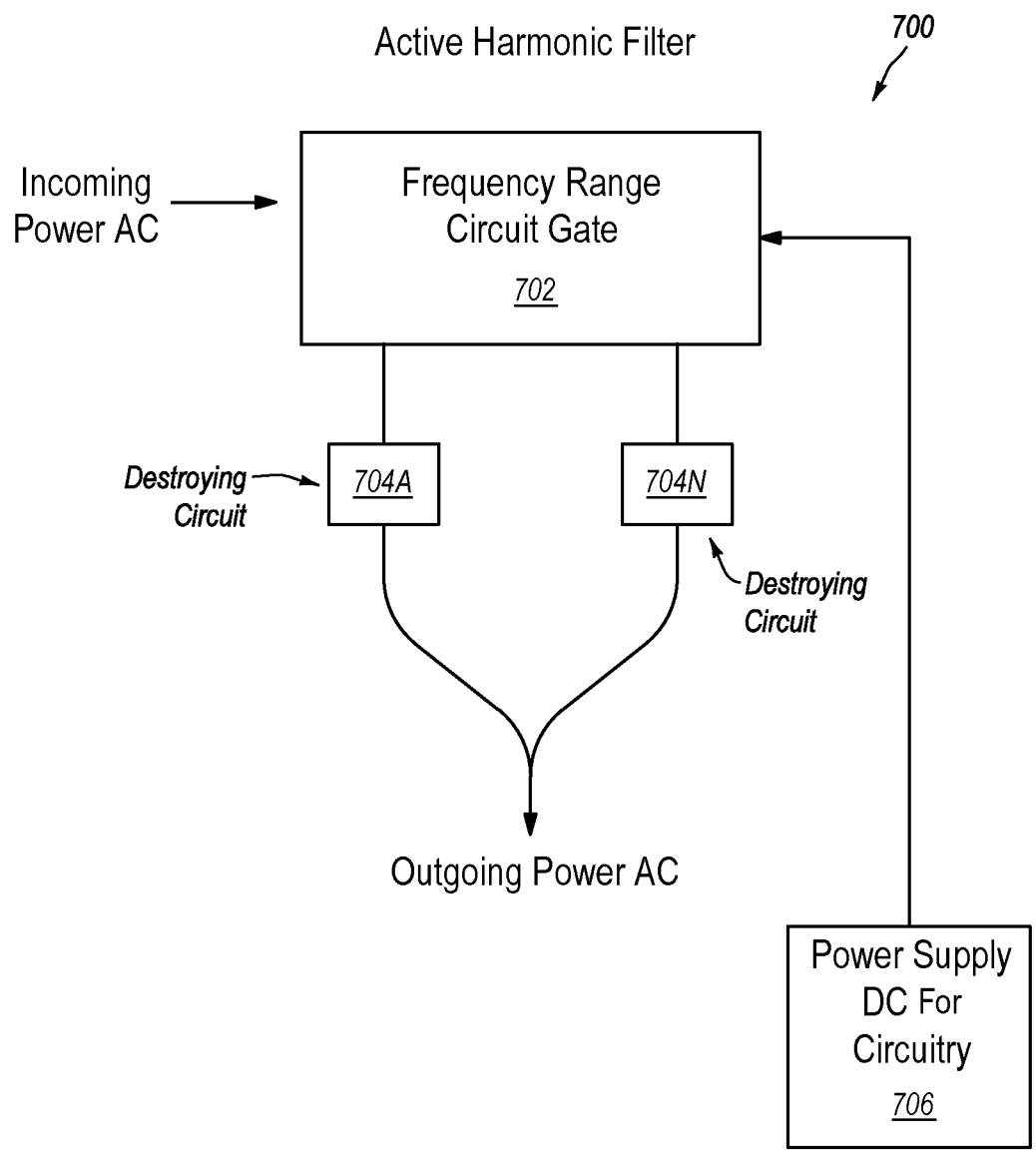
FIGS. 7A and 7B illustrate an example embodiment of an active harmonic filter and components thereof that can be implemented in the power control systems of FIGS. 1 and 2.
Figure 7B:
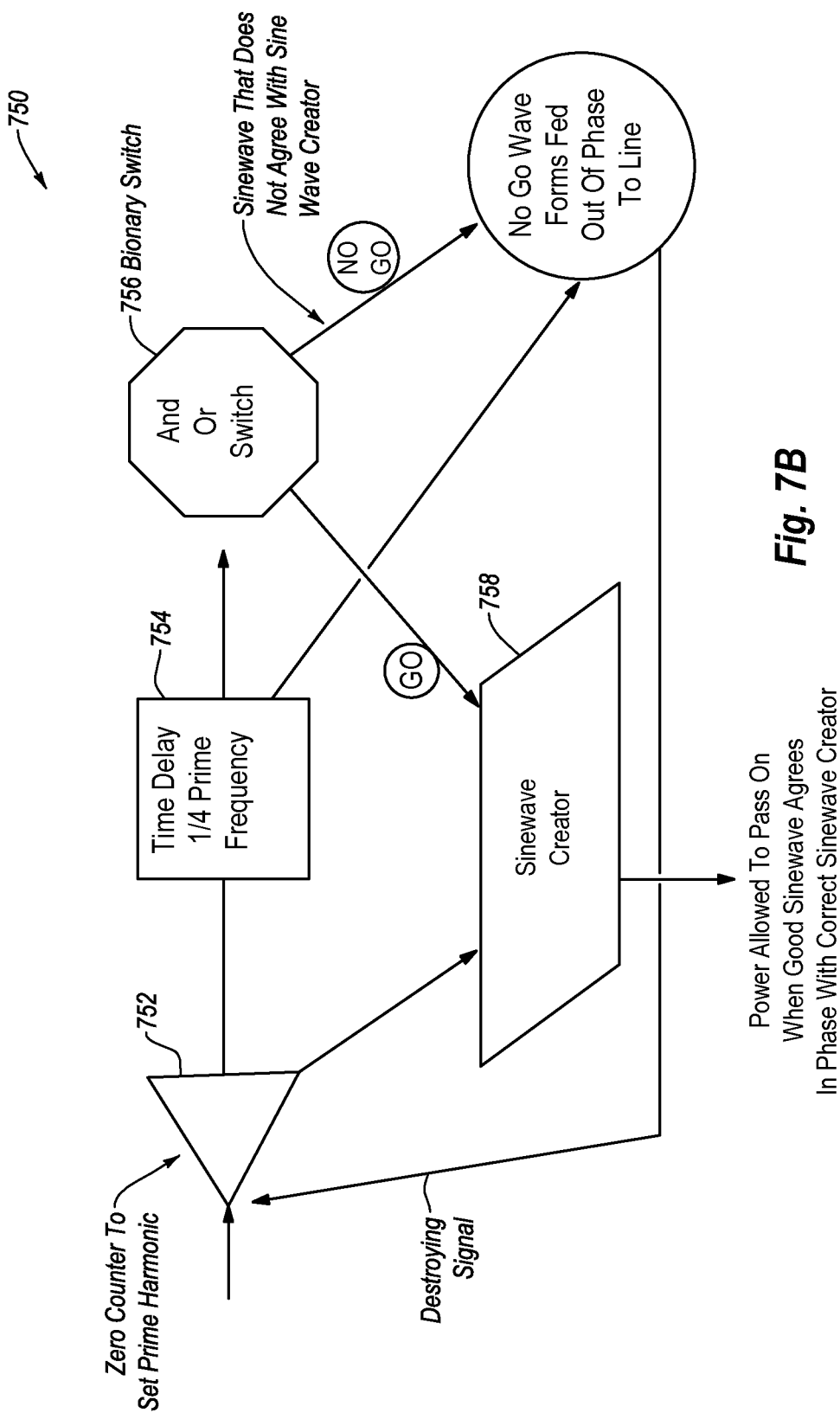

With additional reference to FIGS. 7A and 7B, aspects of an example active harmonic filter 700 will be disclosed that can be implemented in conjunction with the power control system 100 of FIG. 1, or in other environments. The active harmonic filter 700 can be controlled as a stage by, e.g., the controller 106 or 600 of FIG. 1 or 6, for example. Further the active harmonic filter 700 can be coupled in series to the primary busbars 102 of FIG. 1, for instance.

As shown in FIG. 7A, the active harmonic filter 700 includes a frequency range circuit gate 702, and one or more harmonic frequency destroying circuits 704A up to 704N. In some embodiments, the active harmonic filter 700 is configured to be coupled to a direct current ("DC") power supply 706 to supply DC power to one or more components of the active harmonic filer 700. The DC power may comprise 50 volts DC in some embodiments.

Alternately or additionally, the active harmonic filter 700 can be configured to destroy 25 amps of harmonic power. Alternately or additionally, a plurality of harmonic filters can be stacked to mitigate harmonics that are more powerful than 25 amps.

In some embodiments, the active harmonic filter 700 is not to be construed to be operated as a multi-level notch filter. Each of destroying circuits 704A-704N can be a multi-bandwidth system that does not involve notch filtration in any way. As will be explained below, if a harmonic anomaly is small, the mitigation provided by the active harmonic filter 700 will also be small and in perfect imitation of the harmonic sent against itself.

Although the active harmonic filter 700 will be discussed in the context of a 3-phase system approximating 480 volts, embodiments of the invention are not limited to 3-phase systems approximating 480 volts. For instance, the active harmonic filter 700 can be configured to handle more or less than 480 volts and/or in can be configured to operate in single phase mode, as will be appreciated by those skilled in the art with the benefit of the present disclosure.

In some embodiments of the invention, each of the one or more destroying circuits 704A-704N can be configured to substantially eliminate a particular harmonic frequency in the 60 Hz-100 kHz range. As such, the exact number of destroying circuits 704A-704N can depend on the particular harmonic frequencies present in a power distribution system. For instance, a power distribution system for a single-family dwelling is likely to have fewer problematic harmonic frequencies in the 60 Hz-100 kHz range than the power distribution system for a multi-story office dwelling. Thus, in some embodiments, the active harmonic filer 700 can be built after first identifying the harmonic frequency(ies) present in the corresponding power distribution system.

Some power distribution systems may require an active harmonic filter 700 with as many as fourteen destroying circuits 704A-704N to substantially eliminate up to 14 problematic harmonic frequencies in the 60 Hz-100 kHz range. Alternately, other power distributions systems may not require an active harmonic filter 700 at all. Alternately, other power distribution systems may require an active harmonic filter 700 with as few as one destroying circuit to substantially eliminate as few as one problematic harmonic frequency.

The frequency range circuit gate 702 is configured to be coupled to the primary busbars 102 of FIG. 1 and to identify particular harmonics in the multiple phase power signal carried by the primary busbars 102. Upon identifying a particular harmonic, the frequency range circuit 702 feeds the power signal to the appropriate destroying circuit 704A-704N.

Each destroying circuit 704A-704N is configured to substantially eliminate harmonic frequencies within a particular harmonic frequency domain centered around a particular problematic harmonic frequency. The harmonic frequency domains can be configured to slightly overlap each other by three distinct frequencies beyond each domain.

One example embodiment of a destroying circuit 750 for a prime harmonic is disclosed in FIG. 7B. The destroying circuit 750 includes a counter 752, a time delay 754, a logic circuit 756, and a sine wave creator 758. In some embodiments, the prime frequency of the multiple phase power signal may be at or around 60 Hz for North America, 50 Hz for the UK, or 400 Hz in the aerospace field. However, the nominal prime frequency is not always the true prime frequency. Accordingly, the zero counter 752 can be configured to determine a prime frequency of the multiple phase power signal by counting zeros in the power signal. Assuming the power signal is sinusoidal, the true prime frequency can be determined by counting three successive zero voltage levels and comparing against an internal clock.

In the example of FIG. 7B, the time delay 754 is configured to delay the power signal by ¼ phase to create an out-of-phase signal. Further, the logic circuit 756 is configured to lock to the sine wave creator 758 and the sine wave creator 758 can be configured to imitate the true prime frequency. The logic circuit 756 can be configured to compare the ¼ out-of-phase power signal to the created sinewave. If the two signals are equal, the logic circuit 757 is configured to allow the ¼ out-of-phase power signal to pass through the destroying circuit 750 unchanged. If the ¼ out-of-phase power signal is different from the created sinewave, the logic circuit 756 can be configured to feed the ¼ out-of-phase power signal back against the actual power signal to destroy the harmonic frequency.

Although the active harmonic filter 700 has been described as being coupled in series to the power distribution system, the active harmonic filter 700 can alternately be coupled to the power distribution system in parallel. In this embodiment, there is no differential between Delta or Wye connected three phase power. However, mitigation efficiency can be optimized if the location of the source of the harmonic frequency is known. In this case, the active harmonic filter can be coupled to the power distribution system proximate the source of the harmonic frequency.

Further, in some embodiments, the active harmonic filter 700 remains at rest and is not engaged if the logic circuit 757 does not detect any harmonic outside of the prime. Therefore each of up to fourteen domains can operate independently of each other and can be driven only when called for.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power control system, comprising:
   one or more stages, each of the one or more stages configured to generate a lead current when coupled in parallel to a power distribution system, at least one of the one or more stages comprising a notch filter and a power tank circuit, wherein each of the stages includes one or more power capacitors configured to create the lead current;
   a plurality of primary busbars operatively coupled to each of the one or more stages, each of the plurality of primary busbars configured to carry one phase of a multiple phase power signal, wherein each stage is configured to reduce or cancel out a lag current in the multiple phase power signal carried by the plurality of primary busbars; and
   a controller operatively coupled to each of the one or more stages and configured to:
      determine when to switch each of the one or more stages on and off;
      count a number of times each stage is switched on; and
      track one or more electrical parameters of the power distribution system, power control system, or both.

2. The power control system of claim 1, wherein each of the one or more stages comprises:
   a multiple phase circuit breaker coupled to the plurality of primary busbars;
   wherein the one or more power capacitors are configured to create the lead current when the stage is turned on; and
   a capacitor switching contactor coupled between the multiple phase circuit breaker and the one or more capacitors.

3. The power control system of claim 1, wherein the one or more power capacitors comprise a plurality of power capacitors arranged in parallel, and wherein each of the one or more stages further comprise a plurality of secondary busbars coupling the power capacitors to each other in parallel.

4. The power control system of claim 2, wherein the capacitor switching contactor comprises:
   a plurality of contact point sets configured to open and close electrical connections between the plurality of primary busbars and the stage in which the capacitor switching contactor is implemented;
   a plurality of arc chutes, each arc chute positioned proximate a contact point set to receive electrical discharge current caused when the contact point set opens an electrical connection;
   a solenoid mechanically coupled to one contact point of each contact point set and configured to impart forces sufficient to open and close the electrical connection to the one contact point; and
   an insulating enclosure configured to form an electromagnetic interference shield around the plurality of contact point sets, the plurality of arc chutes, and the solenoid.

5. The power control system of claim 4, wherein the insulating enclosure comprises plastic with Aluminum thread embedded therein to form the electromagnetic interference shield.

6. The power control system of claim 2, wherein the at least one of the one or more stages further comprises a tuned reactor zig-zag transformer, the one or more power capacitors and the tuned reactor zig-zag transformer of the at least one of the one or more stages forming the notch filter and power tank circuit.

7. The power control system of claim 6, wherein the tuned reactor zig-zag transformer comprises an iron core large enough to prevent magnetic saturation.

8. The power control system of claim 7, wherein the tuned reactor zig-zag transformer weighs about 70 pounds.

* * * * *